(12) United States Patent
Cerchie et al.

(10) Patent No.: US 7,784,741 B2
(45) Date of Patent: *Aug. 31, 2010

(54) MULTI-MODE UNMANNED AND MANNED VEHICLE SYSTEMS AND METHODS

(75) Inventors: Dino A. Cerchie, Mesa, AZ (US); Gregory E. Dockter, Mesa, AZ (US); William Mark Hardesty, Chandler, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/135,055

(22) Filed: Jun. 6, 2008

(65) Prior Publication Data

US 2009/0045296 A1 Feb. 19, 2009

Related U.S. Application Data

(62) Division of application No. 11/388,026, filed on Mar. 22, 2006, now Pat. No. 7,624,943.

(51) Int. Cl.
*B64C 27/00* (2006.01)

(52) U.S. Cl. ............... 244/197; 244/17.11; 244/76 R

(58) Field of Classification Search ............ 244/17.11, 244/75.1, 76 R, 190, 189, 194, 196, 197, 244/17.13

See application file for complete search history.

(56) References Cited

U.S. PATENT DOCUMENTS 2,620,683 A  12/1952  Geyer (Continued)

FOREIGN PATENT DOCUMENTS

JP  08 295294 A  11/1996

(Continued)

OTHER PUBLICATIONS

PCT Search Report, Jun. 19, 2008, Boeing Company.

(Continued)

*Primary Examiner*—Timothy D Collins
*Assistant Examiner*—Michael Kreiner
(74) *Attorney, Agent, or Firm*—Haynes & Boone, LLP.

(57) ABSTRACT

An apparatus for converting a manned aircraft of a type including at least one pilot control capable of manipulation to affect operation of the aircraft for unmanned flight operations includes first and second actuators, each configured to selectively provide movement or resistance to movement in a first manner including linear or rotational motion, first and second clutches, each configured to selectively couple movement of the associated actuator to the pilot control, and a vehicle controller capable of being selectively enabled to operate the pilot control actuators and clutches and thereby provide unmanned operation of the aircraft, or of being disabled, thereby providing for manned operation of the aircraft. The first actuator has a first scope describing a first amount of allowable movement, while the second actuator has a second scope larger than the first scope.

4 Claims, 11 Drawing Sheets

U.S. PATENT DOCUMENTS

| | | |
|---|---|---|
| 2,852,212 A | 9/1958 | Mallery |
| 3,421,719 A | 1/1969 | Ask |
| 4,109,886 A | 8/1978 | Tribken et al. |
| 4,834,319 A * | 5/1989 | Ewy et al. .................. 244/99.9 |
| 5,001,646 A | 3/1991 | Caldwell et al. |
| 5,240,207 A * | 8/1993 | Eiband et al. ............... 244/190 |
| 5,797,564 A | 8/1998 | Cartmell et al. |
| 5,806,806 A | 9/1998 | Boehringer et al. |

FOREIGN PATENT DOCUMENTS

| | | |
|---|---|---|
| WO | PCT/US2007/005940 | 7/2007 |

OTHER PUBLICATIONS

Boeing, "The Revolutionary Boeing Carnard Rotor/Wing Aircraft Begins Flight Testing"; Chicago, Dec. 4, 2003;http:/www.boeing.com/news/releases/2003/q4/nr_031204a.html;(2pp).

Boeing;"Boeing (Frontier Systems/Robinson) Maverick"; http:/www.designation-systems.net/dusrm/app4/maverick.html;Aug. 2005(2pp).

Cerchie et al."Rapid Development of a Rotorcraft UAV System", The Boeign Company; pp. 1-8; Jan. 18, 2005(8pp).

Machine Design; "Newest UAV is a Converted Chopper", May 5, 2005, XP002482976, URL: http://machinedesign.com/ContentItem/60558/NewestUAVisaconvertedchopper.aspx (1pg).

* cited by examiner

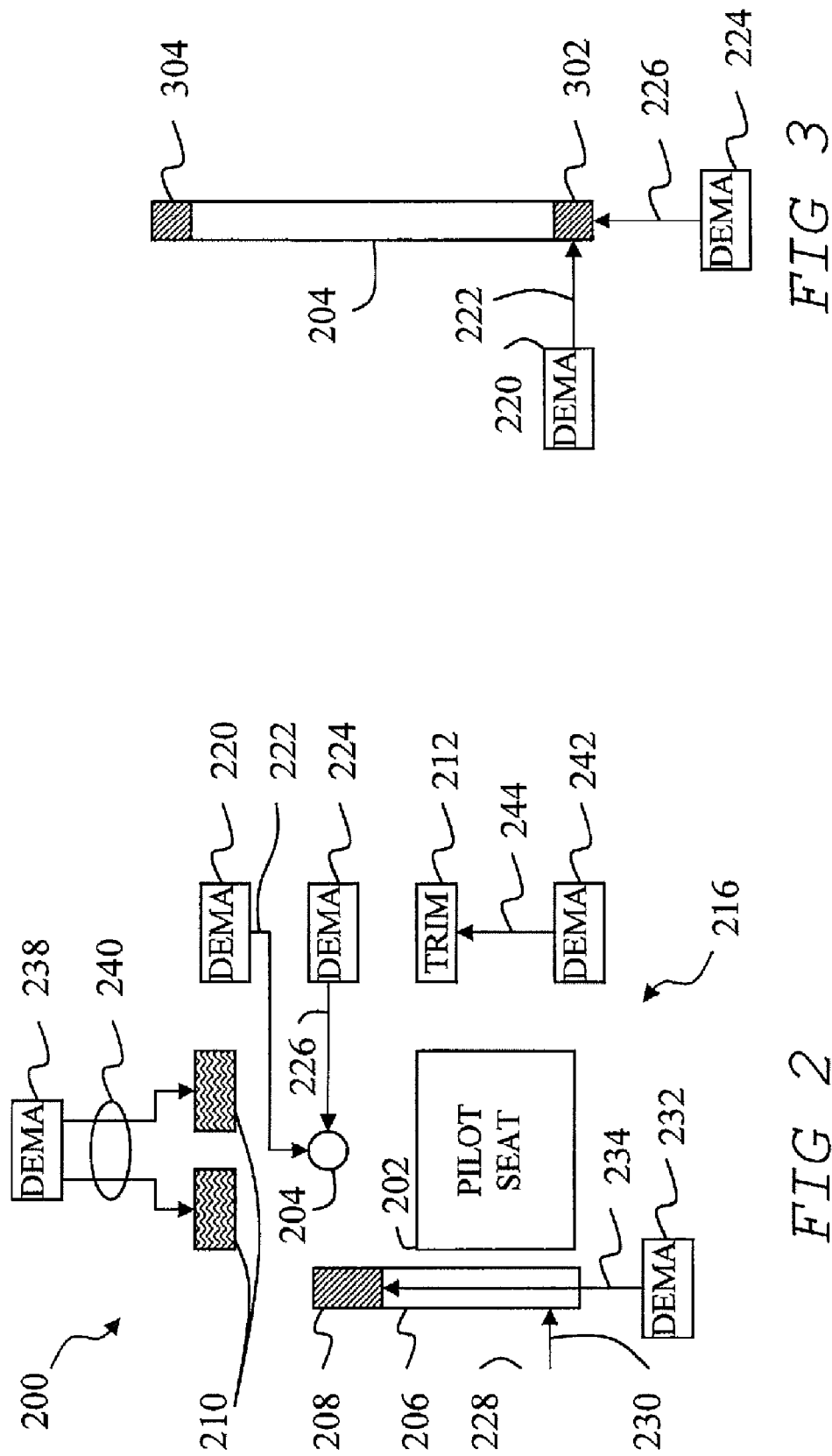

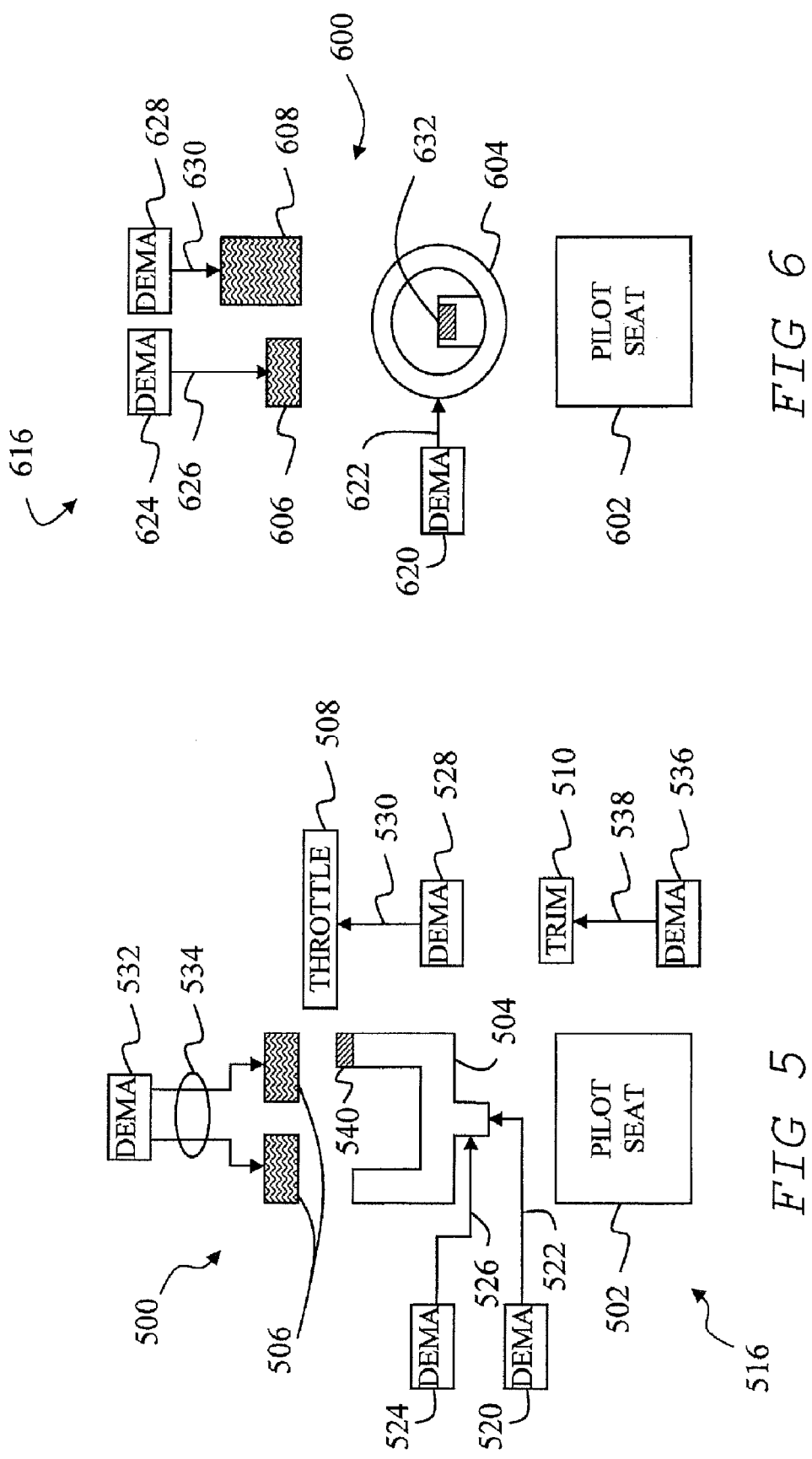

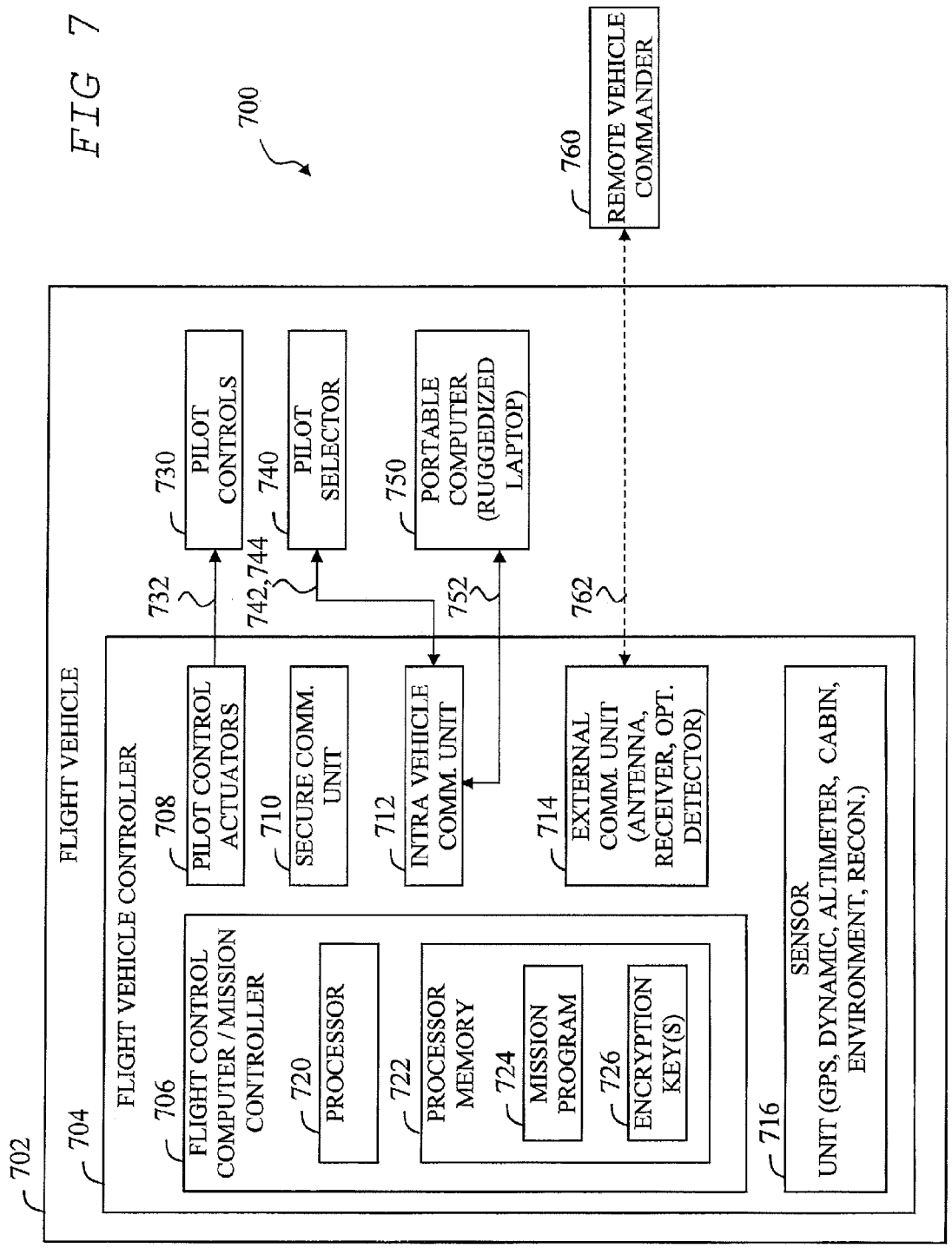

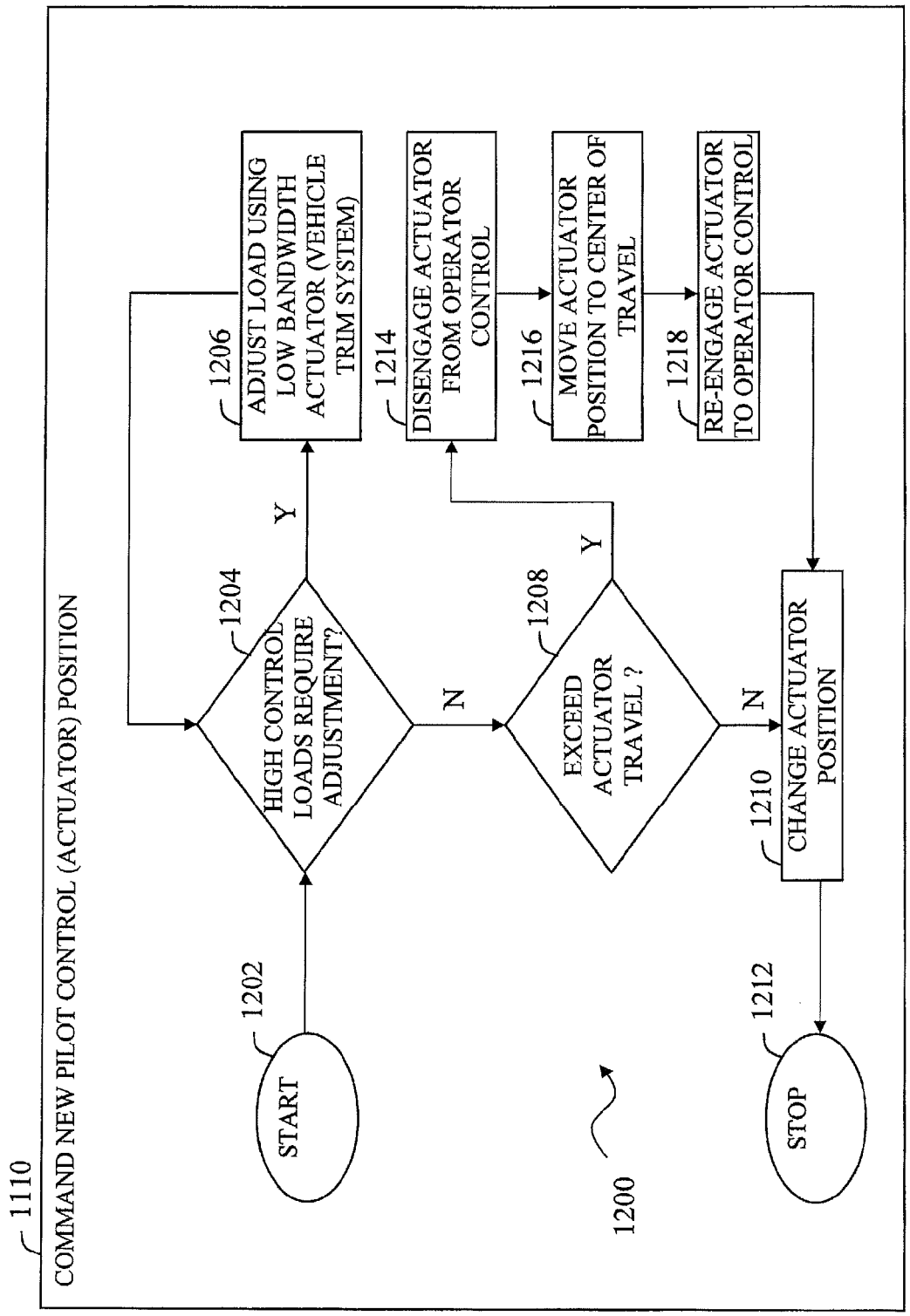

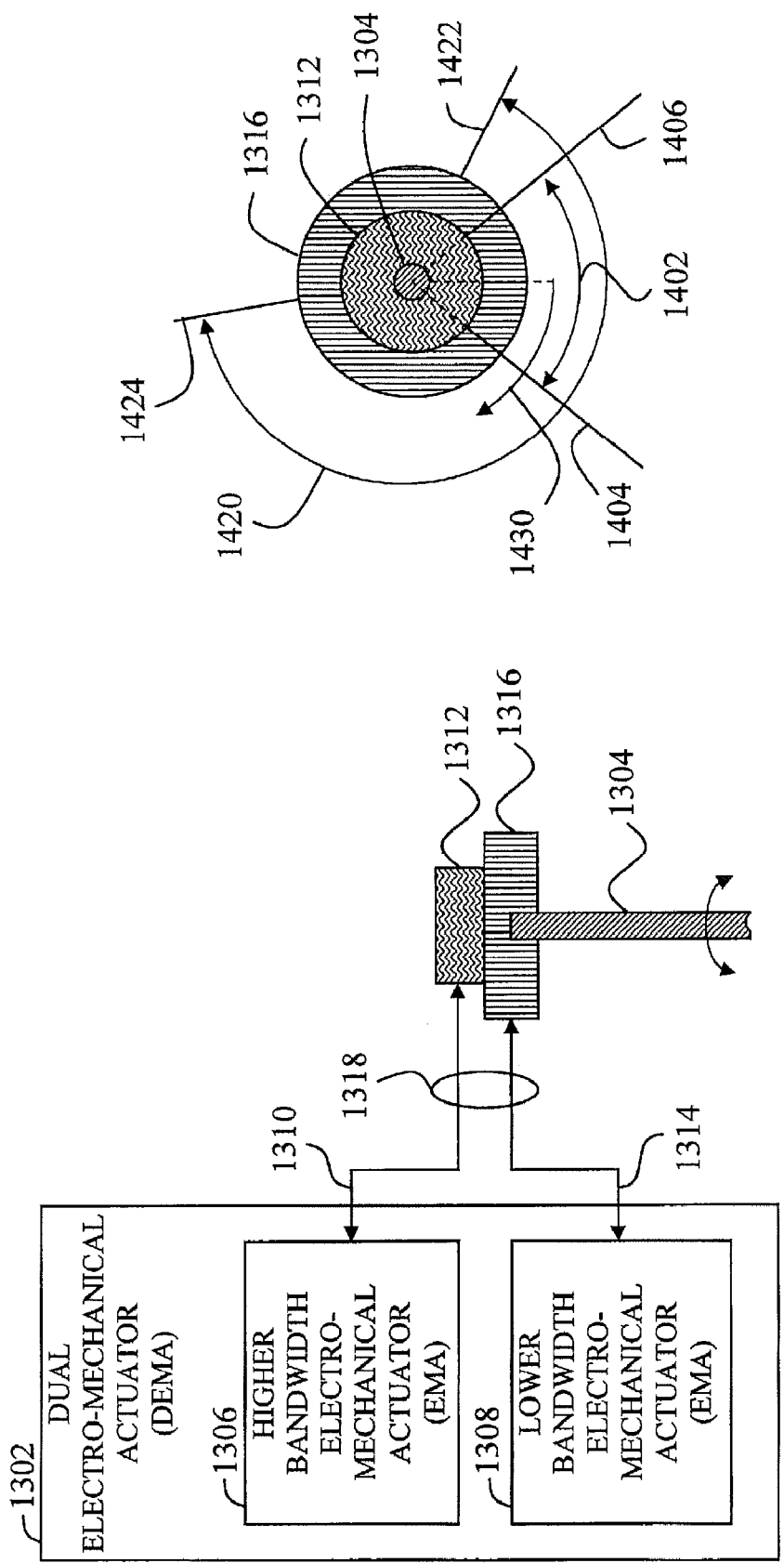

MULTI-MODE UNMANNED AND MANNED VEHICLE SYSTEMS AND METHODS

RELATED APPLICATIONS

This application is a divisional of U.S. patent application Ser. No. 11/388,026, filed Mar. 22, 2006, now U.S. Pat. No. 7,624,943, issued Dec. 1, 2009, the entire disclosure of which is incorporated herein by reference.

TECHNICAL FIELD

The present invention relates generally to vehicles, and more particularly, to multi-mode unmanned and manned vehicle systems and methods.

RELATED ART

Unmanned vehicles may be used for various applications in which a human pilot is either not available or where the parameters of a particular mission profile makes it undesirable to use a human pilot. There is a current trend in aviation towards the use of unmanned aerial vehicles (UAVs). Pilotless, or drone aircraft, have long been used successfully for various missions, including reconnaissance and/or engagement of an enemy force. Many unmanned vehicle development projects start from such baseline aircraft and proceed to develop not only the unmanned attributes of a vehicle, but the vehicle itself. This approach increases the cost of development, whereas, there is a growing market for low-cost UAVs. Therefore, in view of these issues and others, there remains a need in the art for a more cost effective approach to the development and deployment of unmanned vehicles.

SUMMARY

In accordance with the present disclosure, a vehicle is provided that is capable of unmanned operation while preserving a manned operational capability. In this manner, the unmanned operation becomes a new mission capability for the manned vehicle, thereby providing a lower cost approach for developing the unmanned vehicle. This approach has been proven on a single rotor MDHI MD530F helicopter (MD Helicopters, Inc. of Mesa, Ariz., USA), and may be extended to various other manned vehicle types. Basing a new unmanned vehicle development on an existing manned vehicle platform enables the new unmanned vehicle to use all of the existing manned vehicle options to effectively accelerate development of the unmanned vehicle at a very low cost, ensures that the logistics and maintenance of the vehicle are virtually the same and that improvements to the vehicle platform benefit both modes, and that traditionally manned vehicle manufacturers are able to quickly enter the unmanned vehicle markets. Pairing both manned and unmanned operation of a vehicle in this manner provides an attractive domestic and foreign market approach.

More specifically, in accordance with an embodiment of the present invention, an apparatus for converting a manned aircraft for unmanned flight, the aircraft including at least one pilot control capable of manipulation to affect operation of the aircraft, the apparatus comprising a first actuator configured to selectively provide at least one of movement and resistance to movement in a first manner, including at least one of linear and rotational motion, and having a first scope describing a first amount of allowable movement, a first clutch configured to selectively couple movement of the first actuator to the pilot control, a second actuator configured to selectively provide at least one of movement and resistance to movement in the first manner and having a second scope larger than the first scope, a second clutch operatively coupled to the pilot control and configured to selectively couple movement of the second actuator to the pilot control, and a vehicle controller. The vehicle controller is capable of being selectively enabled to operate the pilot control actuators and clutches to selectively manipulate the pilot control providing unmanned operation of the aircraft, and to be disabled, providing manned operation of the aircraft.

In accordance with another embodiment of the present invention, a helicopter includes a plurality of pilot controls configured for operation of the helicopter by a pilot for manned operation, a plurality of dual pilot control actuators, a vehicle controller configured to operate the pilot control actuators, and a pilot selector configured to enable or disable the vehicle controller during manned or unmanned operation of the helicopter. The pilot controls are capable of manipulation to affect operation of the helicopter, and each dual pilot control actuator is configured for operation of a pilot control and includes a first actuator, a first clutch, a second actuator, and a second clutch. The first actuator is configured to selectively provide at least one of movement and resistance to movement in a first manner, including at least one of linear and rotational motion, and having a first scope describing a first amount of allowable movement. The first clutch is configured to selectively couple movement of the first actuator to the pilot control, the second actuator is configured to selectively provide at least one of movement and resistance to movement in the first manner, and has a second scope that is larger than the first scope. The second clutch is operatively coupled to the pilot control and configured to selectively couple movement of the second actuator to the pilot control. The vehicle controller is configured to operate each dual pilot control actuator, where the vehicle controller is selectively enabled to provide unmanned operation of the helicopter and selectively disabled to provide manned operation of the helicopter. The vehicle controller is configured to receive command information from a computer in the helicopter or a remote operator separated from the helicopter.

In accordance with another embodiment of the present invention, a method of piloting a vehicle includes the operations of modifying an aircraft configured for operation by a pilot for manned operation and having at least one pilot control to include a vehicle controller and at least a first pilot control actuator and a second pilot control actuator in a dual actuator configuration, detecting whether the vehicle controller is enabled, sensing at least one aircraft property, computing a vehicle controller response based on the at least one sensed property, and piloting the modified aircraft using the vehicle controller by operating the at least two pilot control actuator according to the vehicle controller response when the vehicle controller is enabled. The at least two pilot control actuators are operatively coupled with the at least one pilot control to provide an enhanced bandwidth capability.

In accordance with another embodiment of the present invention, a helicopter includes a means for controlling the operation of the helicopter by a pilot for manned operation, a means for actuating each controlling means using a means for selectively engaging each means for actuating, and a means for operating each actuating means. Each means for controlling is capable of manipulation to affect operation of the helicopter, and each means for actuating is configured to manipulate at least one controlling means. Each means for actuating includes a first actuator having partial authority and a second actuator having full authority, the bandwidth of the first actuator being higher than the bandwidth of the second actuator to provide an enhanced bandwidth capability, and each means for operating being configured to operate at least one actuating means. The operating means is selectively enabled to provide unmanned operation of the helicopter and disabled to provide manned operation of the helicopter.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

FIG. 2 is a schematic plan view of a portion of an example embodiment of a helicopter vehicle pilot position including pilot controls in accordance with the present invention.

FIG. 3 is a schematic side elevation view of an example embodiment of a helicopter cyclic pilot control in accordance with the present invention.

FIG. 5 is a schematic plan view of a portion of an airplane vehicle pilot position including pilot controls according to an embodiment of the present invention.

FIG. 6 is a schematic plan view of a portion of an automobile vehicle pilot position including pilot controls according to an embodiment of the present invention.

FIG. 7 is a functional block diagram of a flight system according to an embodiment of the present invention.

FIG. 12 is an actuator positioning flow diagram according to an embodiment of the pre-sent invention.

FIG. 13 is a schematic and functional block diagram of an exemplary dual electromechanical actuator operatively coupled to an interface element according to an embodiment of the present invention.

FIG. 14 is a schematic end view of a first clutch, a second clutch and an interface element according to an embodiment of the present invention.

Embodiments of the present invention and their advantages are best understood by referring to the detailed description that follows. In the drawings, like reference numerals are used to identify like elements illustrated in one or more of the figures thereof.

DETAILED DESCRIPTION

One or more embodiments of the present invention are drawn to one or more systems and/or methods related to a vehicle controlled alternately by a pilot and a vehicle controller. In accordance with one or more embodiments of the present invention, a manned vehicle, such as a helicopter configured for operation by a human pilot, may be converted for operation as an unmanned helicopter while maintaining the ability to fly the helicopter in a manned pilot mode. In this manner, the vehicle controller may be disengaged so that the vehicle may be piloted by a human pilot. Alternatively, the vehicle controller may be engaged so that the vehicle may be piloted by the vehicle controller.

Similarly, one or more associated vehicle systems (e.g., weapons and/or surveillance systems) may be controlled alternately by the pilot and the vehicle controller. Therefore, at least four modes of operation are possible: 1) manned piloting of the vehicle and manned operation of associated vehicle systems for a completely manned operation of both the vehicle and associated vehicle systems, 2) manned piloting of the vehicle and unmanned operation of the associated vehicle systems for a partially manned operation of the vehicle and associated vehicle systems, 3) unmanned piloting of the vehicle and manned operation of one or more associated vehicle systems for a partially manned operation of the vehicle and associated vehicle systems, and 4) unmanned piloting of the vehicle and unmanned operation of the associated vehicle systems for a completely unmanned operation of the vehicle.

Transition between these modes of operation may occur during operation of the vehicle or from a non-operational state without limitation. In these different operating modes, a pilot or passenger may be involved to a varying degree throughout a particular mission or mission segment in order to supplement and/or replace one or more human operators and/or pilots. Further, a ground-based operator and/or pilot may be used to pilot the vehicle and/or operate one or more associated vehicle systems. Although reference is made to aircraft including helicopters and airplanes, other applications of embodiments of the present invention may include any manned vehicle, including spacecraft, airships, automobiles, trucks, boats, and/or hovercraft.

Figure 1:
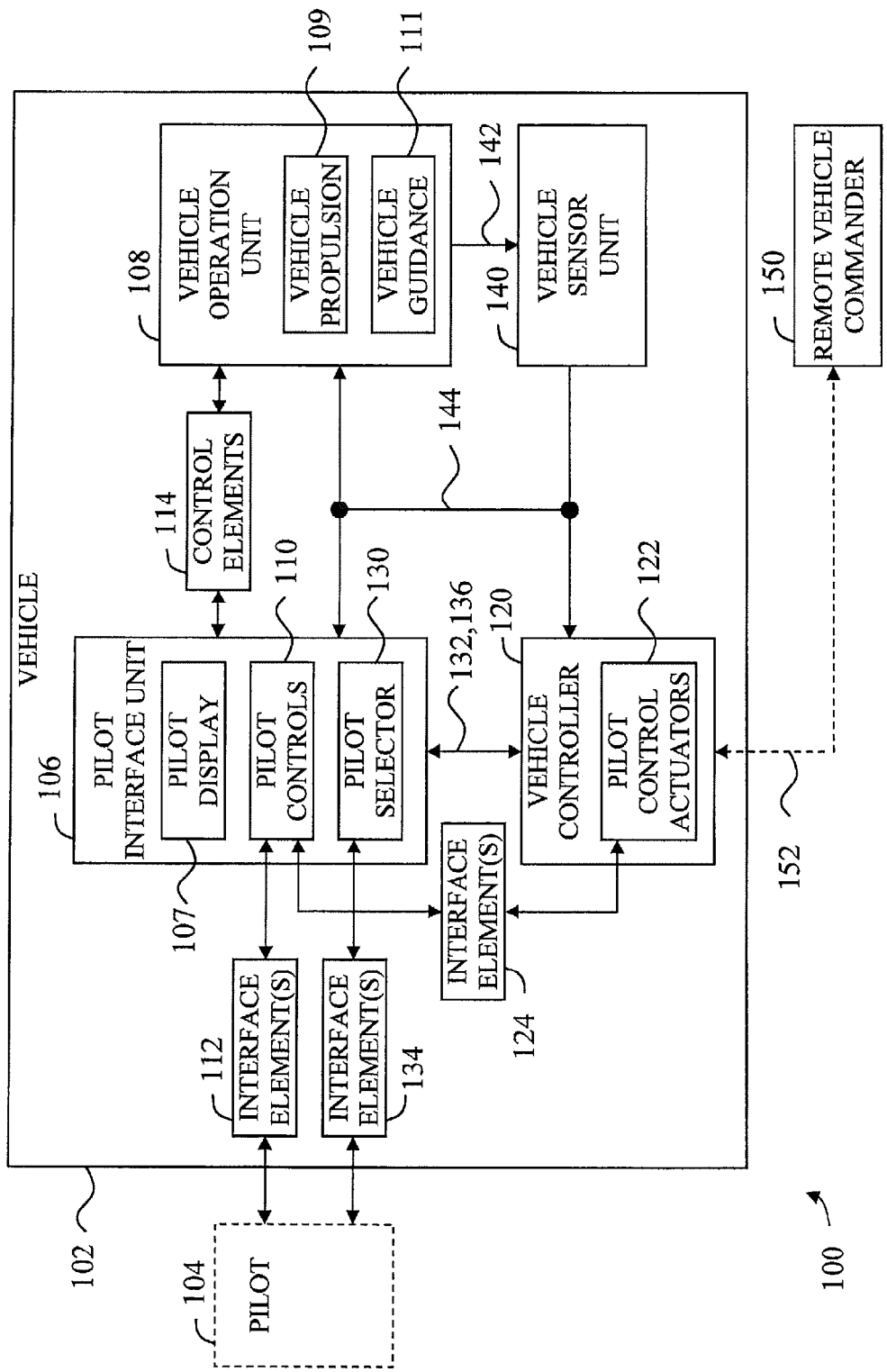
FIG. 1 is a functional block diagram of an example embodiment of a vehicle system in accordance with the present invention.

FIG. 1 illustrates a vehicle system 100 according to an embodiment of the present invention. System 100 may include a vehicle 102 capable of manned operation by a pilot 104, where vehicle 102 is converted for unmanned operation while retaining the manned operational capability.

Vehicle 102 may include a pilot interface unit 106 and a vehicle operation unit 108. Pilot interface unit 106 may include one or more pilot displays 107 and/or one or more pilot controls 110 for use in operation of vehicle 102, and vehicle operation unit 108 may include the vehicle propulsion 109 and vehicle guidance 111 systems and/or mechanisms to provide directed movement of vehicle 102.

Pilot 104 may read or observe data on display 107 to receive information, including the state, location, and/or performance of vehicle 102. Display 107 may include a Head's Up Display (HUD) and/or a monitor, such as a Cathode Ray Tube (CRT), a Liquid Crystal Display (LCD), and/or other display apparatus that provides visual and/or auditory information to pilot 104 and/or other passengers on vehicle 102. By manipulation of one or more pilot accessible interface elements or portions 112 of pilot controls 110, pilot 104 supplies commands to and may receive feedback from the vehicle operation unit 108 for controlling the operation of vehicle 102. For example, element 112 may include a lever, control arm, a grip, a foot pedal, a toggle, a button, or other mechanism for interfacing with a pilot or vehicle operator, so that manipulation of element 112 may include the pilot pulling, pushing, rotating, moving, or resisting movement of element 112. In this manner, pilot interface unit 106 may communicate the pilot commands to and receive feedback from vehicle operation unit 108 through various mechanical and/or electrical control elements 114, which may include one or more pushrods, levers, solenoids, gears, pulleys, belts, clutches, and/or command and control systems, alone or in combination.

According to one embodiment, vehicle 102 includes a vehicle controller 120 that may interface with and/or include a plurality of pilot control actuators 122 enabled to selectively provide mechanical movement of pilot controls 110 through a mechanical and/or electrical connection comprising one or more interface elements or linkages 124, in order to provide operation of the vehicle 102. Alternatively, pilot control actuators 122 may provide a resistance to movement to pilot controls 110 in order to provide operation of vehicle 102. In this manner, the resistance to movement may hold a particular pilot control in a current position, corresponding to no change in the current pilot command for the associated pilot control. Vehicle controller 120 may include a suitably programmed computer processor configured to process system and vehicle state logic and execute piloting commands through the actuators 122 in order to operate vehicle 102. In this manner, vehicle 102 may be operated by vehicle controller 120 through the same vehicle control means accessed by pilot 104. Interface elements (IE) 124 and interface elements 112 may include one or more of the same interface elements for interfacing between a pilot or vehicle operator.

Vehicle controller 120 may be selectively enabled and disabled so that vehicle 102 may be operated either by pilot 104 in a manned mode or by vehicle controller 120 in an unmanned mode. Pilot 104 may enable or disable vehicle controller 120 by manipulating a pilot selector 130 that communicates pilot select information 132 to vehicle controller 120. Pilot select information 132 may include an electrical signal and/or a mechanical movement to selectively enable or disable vehicle controller 120. Pilot 104 may access pilot selector 130 directly or through a pilot select interface element or linkage 134 located at or near the pilot operating position in vehicle 102. Interface elements (112, 124, 134) may include one or more of pushrods, levers, solenoids, gears, pulleys, belts, clutches, and/or command and control systems, alone or in combination, and are configured to communicate movement from either a human pilot or an actuator to one or more pilot controls 110 and/or pilot selector 130.

Two or more pilot control actuators 122 may be paired into a dual actuator configuration, where more than one actuator and preferably two actuators may be used to manipulate a pilot control along a particular degree of freedom (DOF), such as an axis of rotation, a linear motion, and/or within a plane of motion such as described by a sweeping motion about a pivot point. Hence, pilot control actuators 122 may include rotational actuators, linear actuators, and/or a combination of rotational and linear actuators to provide the required actuation motions. Dual actuators may be used to provide an enhanced bandwidth capability.

Vehicle 102 may include a vehicle sensor unit 140 with one or more sensors configured to receive information 142 from vehicle operations unit 108 and/or other vehicle systems in order to measure some property or aspect of the vehicle performance and/or vehicle environment and provide a plurality of sensor signals as information 144 to pilot interface unit 106, vehicle operation unit 108, and/or vehicle controller 120. Information 144 may be measurement signals from one or more sensors that provide a measurement of various vehicle parameters, including vehicle pitch, roll, yaw, acceleration, fuel capacity, vehicle and/or ambient temperature, engine speed and/or temperature, and/or vehicle status. Also, various additional types of sensor signals may be added to a manned vehicle to provide an unmanned capability. Vehicle controller 120 may include one or more sensors to provide measurement of any such property or parameter not already provided by vehicle sensor unit 140. In this manner, vehicle controller 120 may sense the relevant aircraft properties and compute a vehicle controller response that is communicated to vehicle 102 through pilot control actuators 122 to pilot controls 110.

System 100 may include a remote vehicle commander 150 that provides vehicle command information 152 to vehicle controller 120. Remote vehicle commander 150 may include a pilot located at a remote site defined as anywhere except for in direct contact with pilot controls 110. Alternatively, remote vehicle commander 150 may include a computer operated system configured to provide closed loop control of vehicle 102 through pre-programmed vehicle commands, where the computer operated system is located either on vehicle 102 or located at some remote site, such as a ground station and/or other remote site from vehicle 102. Further, vehicle controller 120 may be located in an unused space within a pilot or passenger compartment to allow continued seating of a pilot, co-pilot, other crew members, and/or passengers. At least a portion of vehicle controller 120 may be accessible from outside vehicle 102 through a lockable door or access panel to provide for removal of components or media associated with vehicle controller 120 in order to promote security and/or minimize loss of sensitive information.

Remote vehicle commander 150 may send an override command to vehicle controller 120 to selectively enable or disable vehicle controller 120 regardless of the selection made locally within vehicle 102 by a pilot 104. This capability may compensate for a possible failure in the pilot select 130 mechanism as well as to address a pilot emergency situation. For example, in the event a rogue pilot commandeers vehicle 102 without authorization, remote vehicle commander 150 can take control of vehicle 102 to prevent the loss of a valuable asset, to regain control of vehicle 102 if pilot 104 is disabled due to injury, and/or to remotely pilot vehicle 102 regardless of the previous status of pilot select 130. For an aircraft flying above 10,000 feet, a pressurized cabin and oxygen may be required. In the event of a sudden loss in cabin pressure, a pilot may become disoriented or unconscious if he is not able to receive oxygen from a mask or other emergency supply. If the pilot is not able to achieve the lower altitude in time, it may be necessary for vehicle controller 120 to temporarily take control of vehicle 102 until the pilot is able to regain control.

In another emergency situation, pilot 104 may be unable to respond adequately to an emerging threat. For example, vehicle 102 may be attacked with a weapon so that evasive maneuvers are required. Vehicle controller 120 may detect the necessity of evasive or aggressive maneuvers and implement these maneuvers with or without pilot knowledge or consent. In response to the threat, vehicle controller 120 may put vehicle 102 into a proper offensive attitude. Emergency response conditions may include the necessity of implementing sophisticated recovery techniques, such as an auto-rotate maneuver for a helicopter vehicle that can provide a softer landing after a loss of power.

Emergency response conditions may also include recovery from a vehicle failure or the emergence of a condition that is beyond the ability of a human pilot to adequately negotiate, such as recovery from a flat spin for an airplane vehicle and/or landing on an aircraft carrier with zero visibility. In some cases, a human pilot may become physically overstressed so that pilot performance is degraded, such as by a blackout during an extreme turning maneuver, requiring temporary assistance from vehicle controller 120. Further, emergency response conditions may include the avoidance of a collision either in the air or on the ground. Vehicle controllers in neighboring vehicles may cooperate to provide a coordinated response to an emergency condition, such as collision avoidance, especially when an uncoordinated response may lead to a potentially more hazardous condition.

Finally, remote piloting or vehicle controller piloting of a vehicle may be used during the testing of a new vehicle, such as when it may be too dangerous for a human pilot, when pilot training is needed, and/or to perform an autonomous piloting of the vehicle for some other purpose, including reconnaissance, retrieving a pilot from a remote location, and/or conducing an autonomous cargo sortie by ferrying supplies between locations. In one application, a pilot trainee may utilize the vehicle controller to demonstrate a particular technique or maneuver. In this manner, a pilot trainee may experience the maneuver in a tactile and dynamic way that may be difficult to adequately convey in a pilot simulator.

FIG. 2 is a schematic plan view of a portion of a helicopter vehicle pilot position that includes pilot controls 200 according to an embodiment of the present invention. Where vehicle 102 is a manned helicopter converted for unmanned flight without losing the ability for manned flight, a pilot 104 located at or near pilot seat 202 has access to pilot controls 200 that may include a cyclic 204 or "stick" for controlling one or more rotor heads defining the plane of rotation for each main rotor, a collective 206 for controlling the pitch of the rotor blades, a throttle 208 for controlling the speed of one or more engines, yaw pedals 210 for controlling the speed of a tail rotor configured to control rotation of vehicle 102 in a yaw direction, and/or trim controls 212 for applying corrections to one or more maneuvering controls. Although shown as a single element, trim controls 212 may include one or more trim pilot interface elements.

Other pilot controls 200 may include landing gear operation, cargo winch operation, door operation, and/or weapon system targeting and/or deployment. Hence, this list of pilot controls 200 is not to be construed as limiting. When pilot 104 manipulates pilot controls 200, vehicle 102 responds based on the dynamics of the vehicle conditions, including speed, altitude, attitude, and vehicle status. At least two associated actuators may be operatively coupled in a dual actuator configuration to provide manipulation of each associated pilot control 200. Typically, an individual actuator may be used for each degree of freedom provided by the associated pilot control. When actuation of the associated pilot control requires a linear movement, a linear actuator may be used. Conversely, when actuation of the associated pilot control requires a rotational movement, a rotational actuator may be used.

In one embodiment, pilot control actuators 216, such as electromechanical actuators (EMAs), where two associated EMAs may be combined into a dual EMA (DEMA), may be used to provide manipulation of one or more pilot controls 200. As will be more fully described below, the two EMAs in the dual EMA configuration cooperate to provide a novel capability for enhanced bandwidth operation, and one of the EMAs associated with a particular pilot control 200 may already be included with the vehicle in some embodiments. Preferably, pilot actuators 216 include electromechanical actuators, but alternatively, may include electro-hydraulic, electro-pneumatic, or some other technology configured to respond to electrical/electronic/optical signal control and provide operation of pilot controls 200.

In a helicopter embodiment, a lateral DEMA 220, comprising a roll actuator pair, may operate cyclic 204 through a linkage 222 in order to provide roll commands to the helicopter vehicle. A longitudinal DEMA 224, comprising a pitch actuator pair, may operate cyclic 204 through a linkage 226 in order to provide pitch commands to the helicopter rotor(s). DEMA 220 and DEMA 224 together or separately may operate cyclic 204. A collective DEMA 228 may operate collective 206 through a linkage 230 in order to provide rotor blade pitch commands to one or more helicopter rotors. A throttle DEMA 232 may operate throttle 208 through a linkage 234. A Directional Series DEMA 238, comprising a yaw parallel actuator pair, may operate one or more yaw pedals 210 through one or more linkages 240 in order to provide yaw commands to the helicopter tail rotor and/or related assemblies in order to command a directional orientation or movement for vehicle 102. Finally, a trim DEMA 242 may operate one or more trim controls 212 through one or more linkages 244 in order to provide a bias adjustment to one or more pilot controls and/or control surfaces.

Any associated actuator may be located anywhere along a control path for a particular pilot control. In one example, an actuator configured to operate yaw pedals 210 may be in communication with one or more of the pedals themselves through linkage 240, or the actuator may be in communication with a portion of a pedal operation system anywhere between the pedals 210 and the portion of vehicle 102 directly affected by the operation of pedals 210.

FIG. 3 is a schematic side elevation view of a helicopter cyclic pilot control 204 according to an embodiment of the present invention. DEMA 220 and DEMA 224 may interface with a cyclic extension 302 as an interface element attached to a portion of or extending from cyclic 204. Pilot selector 304, also denoted as a disengage button 304, is a particular embodiment of pilot selector 130 shown in FIG. 1, and may be located on a portion of cyclic 204, such as near a hand-grip portion, for convenient access by a pilot 104 located in a position to grasp cyclic 204.

Although shown in a position on cyclic 204, pilot selector 304 may be located anywhere that may be accessed by pilot 104. Operation of pilot selector 304 may communicate pilot select information 132 to vehicle controller 120 through a communication link 136, as shown in FIG. 1. In one application, a pilot 104 may selectively engage or disengage the operation of vehicle controller 120 by operation of pilot selector 304. Alternatively, enabling or disabling the operation of vehicle controller 120 may be accomplished under computer and/or external control. Also, status and/or other information for vehicle controller 120 may be communicated along link 136 to display 107, as shown in FIG. 1, for communication to pilot 104 and/or other passengers.

Figure 4:
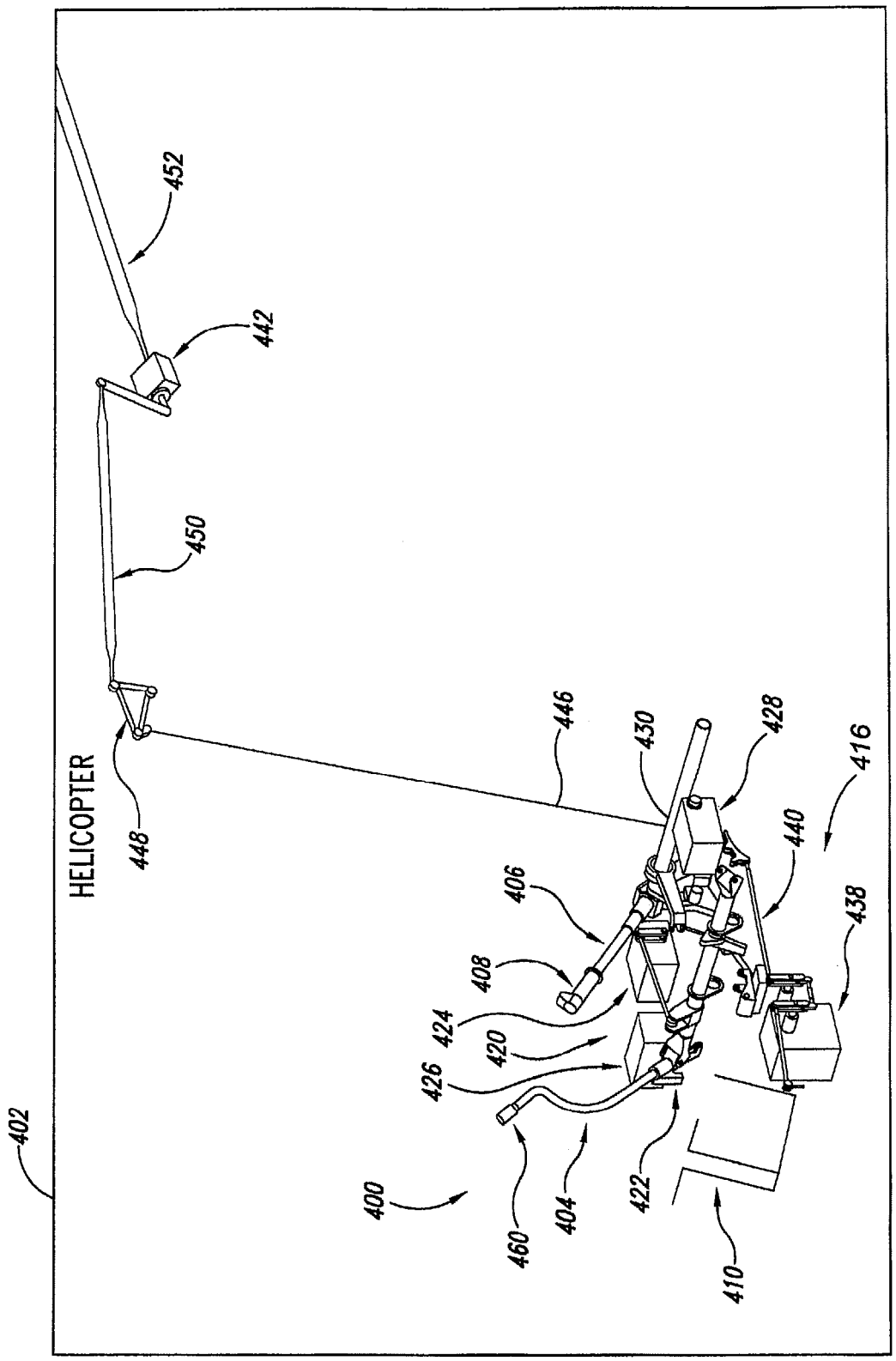
FIG. 4 is a partial perspective view of a portion of a helicopter vehicle pilot position including pilot controls according to an embodiment of the present invention.

FIG. 4 is a perspective view of a portion of a helicopter vehicle pilot position including pilot controls 400 according to an embodiment of the present invention. Where vehicle 402 is a helicopter, pilot controls 400 may include a cyclic 404 or "stick" for controlling one or more rotor heads defining the plane of rotation for each main rotor, a collective 406 for controlling the pitch of the rotor blades, a throttle 408 for controlling the speed of one or more engines, and/or yaw pedals 410 for controlling the speed of a tail rotor configured to control rotation of helicopter vehicle 402 in a yaw direction. Other pilot controls 400 may include trim operation, landing gear operation, cargo winch operation, door operation, and/or weapon system targeting and/or deployment. Hence, this list of pilot controls 400 should not be construed as limiting.

When pilot 104 manipulates one or more pilot controls 400, helicopter vehicle 402 responds based on the dynamics of the vehicle conditions, including speed, altitude, attitude, and vehicle status. At least one associated actuator may provide manipulation of each associated pilot control 400. In one embodiment, pilot control actuators 416, such as electromechanical actuators (EMAs) where two associated EMAs may be combined into a dual EMA (DEMA), may be used to provide manipulation of pilot controls 400. Alternatively, the pilot control actuators 416 may be electro-pneumatic, or some other technology configured to respond to electrical/electronic control and provide operation of pilot controls 400.

In a helicopter embodiment, a lateral DEMA 420, comprising a roll actuator pair, may operate cyclic 404 through a linkage 422 in order to provide roll commands to the helicopter vehicle. A longitudinal DEMA 424, comprising a pitch actuator pair, may operate cyclic 404 through a linkage 426 in order to provide pitch commands to the helicopter rotor(s). DEMA 420 and DEMA 424 together or separately may operate cyclic 404. A collective DEMA 428 may operate collective 406 through a linkage 430 in order to provide rotor blade pitch commands to one or more helicopter rotors. A first directional DEMA 438, comprising a yaw parallel actuator pair, may operate one or more yaw pedals 410 through one or more linkages 440 in order to provide yaw commands to the helicopter tail rotor and/or related assemblies in order to command a directional orientation or movement for helicopter vehicle 402.

A second directional DEMA 442, comprising a yaw series actuator pair, may be coupled with first directional DEMA 438 to provide yaw control for helicopter vehicle 402 through linkages 446, 448, 450, and 452. Any actuator may be located anywhere along a control path for a particular pilot control. Since first directional DEMA 438 and second directional DEMA 442 comprise a directional series control, the two directional EMAs 438 and 442 may be referred to collectively as a directional series dual EMA. Pilot selector 460 is a particular embodiment of pilot selector 304 as shown in FIG. 3, and may be used to selectively enable or disable vehicle controller 120.

FIG. 5 is a schematic plan view of a portion of an airplane vehicle pilot position, including pilot controls 500, according to an embodiment of the present invention. Where vehicle 102 is a manned airplane converted for unmanned flight without losing the ability for manned flight, a pilot located at or near pilot seat 502 has access to pilot controls 500 that may include a yoke 504, rudder pedals 506, a throttle control 508, and/or trim controls 510. Yoke 504 provides roll and pitch control, rudder pedals 506 provide yaw control, throttle control 508 provides engine speed control, and trim 510 provides for corrections to one or more maneuvering controls. Other pilot controls 500 (not shown) may include landing gear operation, cargo winch operation, door operation, and/or weapon system deployment. Hence, this list of pilot controls 500 is not limiting. When pilot 104 manipulates one or more pilot controls 500, vehicle 102 responds based on the dynamics of the vehicle conditions including speed, altitude, attitude, and vehicle status.

In one embodiment, pilot control actuators 516, such as electromechanical actuators (EMAs), or some other technology configured to respond to electrical/electronic control, where two associated EMAs may be combined into a dual EMA (DEMA), may be used to provide manipulation of pilot controls 500. A lateral DEMA 520, comprising a roll actuator pair, may operate yoke 504 through a linkage 522 in order to provide roll commands to the airplane's flight control surfaces, including ailerons. A longitudinal DEMA 524, comprising a pitch actuator pair, may operate yoke 504 through a linkage 526 in order to provide pitch commands to the airplane flight control surface(s), including an elevator or tail horizontal stabilizer. A throttle DEMA 528 may operate throttle 508 through a linkage 530. A Directional Series DEMA 532, comprising a yaw parallel actuator pair, may operate one or more yaw pedals 506 through one or more linkages 534 in order to provide yaw commands to the airplane rudder. Finally, a trim DEMA 536 may operate one or more trim controls 510 through one or more linkages 538 in order to provide adjustments to various maneuvering controls and/or control surfaces. Each dual actuator includes at least two pilot control actuators operatively coupled to the pilot control and configured to manipulate the pilot control, where the dual actuators provide an enhanced bandwidth capability. A pilot selector 540, such as a disengage button 540, may be located on a portion of yoke 504, such as near a hand-grip portion, for convenient access by a pilot 104 in a position to grasp yoke 504. Although shown in a position on yoke 504, pilot selector 540 may be located anywhere that may be accessed by pilot 104.

Operation of pilot selector 540 may communicate pilot select information 132 to vehicle controller 120, as shown in reference to FIG. 1. In one application, a pilot 104 may selectively engage or disengage the operation of vehicle controller 120 by operation of pilot selector 540. Alternatively, enabling or disabling the operation of vehicle controller 120 may be accomplished under computer and/or external control. In this manner, vehicle controller 120 is configured to operate the dual actuators where vehicle controller 120 is capable of being selectively enabled during manned flight to operate the pilot control actuators to provide unmanned operation of the aircraft and disabled during manned flight to provide manned operation of the aircraft. Although FIG. 5 shows pilot controls related to a helicopter vehicle, any type of powered or un-powered aircraft may be used including an airplane, a glider, a blimp, a sub-orbital vehicle, and a spacecraft, where various vehicle-specific pilot controls and associated DEMAs may be used.

FIG. 6 is a plan view of a portion of an automobile vehicle pilot position including pilot controls 600 according to an embodiment of the present invention. Where vehicle 102 is a manned automobile or truck converted for unmanned operation without losing manned operational capability, a pilot 104 located at or near pilot seat 602 has access to pilot controls 600 that may include a steering wheel 604 for controlling the orientation of two or more steerable wheels, a brake 606 for slowing or stopping vehicle 102, and/or an accelerator 608 for controlling the acceleration of vehicle 102. Other pilot controls 600 (not shown) may include handbrake operation, winch operation, and door operation, so this list of pilot controls 600 is not limiting. When pilot 104 manipulates one or more pilot controls 600, vehicle 102 responds based on the dynamics of the vehicle conditions, including speed, orientation, and vehicle status.

In one embodiment, pilot control actuators 616, such as electromechanical actuators (EMAs), or some other technology configured to respond to electrical/electronic control, where two associated EMAs may be combined into a dual EMA (DEMA), may be used to provide manipulation of pilot controls 600. A steering DEMA 620, comprising a steering actuator pair, may operate steering wheel 604 through a linkage 622 in order to provide steering commands to the steerable automobile wheels. A brake DEMA 624, comprising a brake actuator pair, may operate brake 606 through a linkage 626 in order to provide braking commands to vehicle 102. An accelerator DEMA 628, comprising an accelerator actuator pair, may operate accelerator 608 through a linkage 630 in order to provide acceleration commands to vehicle 102. Any associated actuator may be located anywhere along the control path for a particular pilot control 600. A pilot selector 632, such as a disengage button 632, may be located on a portion of steering wheel 604, such as near a hand-grip portion, for convenient access by a pilot 104 in a position to grasp steering wheel 604. Operation of pilot selector 632 may communicate pilot select information 132 to vehicle controller 120, as shown in reference to FIG. 1. In one application, a pilot 104 may selectively engage or disengage the operation of vehicle controller 120 by operation of pilot selector 632. Alternatively, enabling or disabling the operation of vehicle controller 120 may be accomplished under computer and/or external control.

FIG. 7 a functional block diagram of a flight system 700 according to an embodiment of the present invention. Flight vehicle 702 is a particular embodiment of vehicle 102 shown in FIG. 1, and may include a flight vehicle controller 704 that is a particular embodiment of vehicle controller 120 shown in FIG. 2. Flight vehicle controller 704 may include a flight control computer 706, one or more pilot control actuators 708, a secure communication unit 710, an intra-vehicular communication unit 712, an external communication unit 714, and/or a sensor unit 716. Flight control computer 706 may be located either on-board or off-board vehicle 702 and may be located within flight vehicle 702 separate from flight vehicle controller 704. Pilot control actuators 708 are a particular embodiment of pilot control actuators 122 as shown in FIG. 1 and may include electromechanical actuators (EMAs) or some other technology adapted to respond to electrical/electronic control.

Flight control computer 706 or mission controller 706 may include a processor 720 and/or a processor memory 722 that may include a mission program 724 and/or one or more encryption keys 726 for encrypting and decrypting messages in cooperation with secure communication unit 710. In order to prevent unauthorized access to flight controller 704, some or all communications into and out of flight vehicle controller 704 may be encrypted or authenticated using various cryptographic algorithms. Secure communication unit 710 may include a cryptographic processor, a communication firewall, a memory for storing and retrieving cryptographic keys, and/or dedicated cryptographic hardware for use in performing cryptographic functions, including the implementation of cryptographic algorithms, such as the Data Encryption Standard (DES), the Advanced Encryption Standard (AES), the Secure Hash Algorithm (SHA-1), and the Message Digest (MD-5) Algorithm. Alternatively, secure communication unit 710 may be selectively enabled so that only certain commands and information are cryptographically protected. In yet another alternative, secure communication unit 710 may be disabled or omitted altogether so that no information flow is cryptographically protected. In one embodiment, sensor unit 716 includes at least one sensor that provides a measurement signal of a property of the aircraft during flight, where the measurement signal is not used by flight control computer 706, but is instead used by flight vehicle controller 704 to affect operation of one or more dual actuators.

Processor 720 may be a general-purpose computer processor suitably programmed to fetch, decode, and execute computer instructions, including mission program 724. Processor memory 722 may be any medium for storing and retrieving information, including a Random Access Memory (RAM), a Read Only Memory (ROM), a magnetic disc, an optical disc, a content addressable memory, and/or a register file. Processor memory 722 may be removable from flight vehicle controller 702 in order to provide safekeeping of information, to provide convenient transfer to another vehicle controller, and/or reconfiguration of a replacement vehicle controller. Mission program 724 may include an implementation of an algorithm designed to operate flight vehicle 702 according to a predetermined plan including pre-programmed instructions and options for handling various contingencies. Encryption keys 726 may be used to encrypt and decrypt information sent to or received from external communication unit 714 and/or intra vehicle communication unit 712 through secure communication unit 710.

Pilot controls 730 may be either a particular embodiment of pilot controls 200 as shown in FIG. 2, or a particular embodiment of pilot controls 500 as shown in FIG. 5. Alternatively, pilot controls 730 may correspond to a standard set of pilot controls corresponding to any flight vehicle, including a helicopter, airplane, glider, blimp, airship, and/or spacecraft. Pilot controls 730 are coupled with corresponding pilot control actuators 708 through a linkage 732 to provide manipulation of pilot controls 730 in order to operate flight vehicle 702. Pilot selector 740 is a particular embodiment of pilot selector 130 shown in FIG. 1 and provides pilot select information 742 through a communication link 744 to flight vehicle controller 704. In one embodiment, pilot selector 740 includes a status light indicating whether a pilot 104 or flight vehicle controller 704 is in command of flight vehicle 704. In another embodiment, pilot selector 740 includes an electromechanical switch that can be toggled into either an enabled position or a disabled position by flight vehicle controller 704 in order to provide tactile feedback to a pilot regarding the status of pilot selector 740.

Intra vehicle communication unit 712 may communicate with a portable computer 750 located either onboard flight vehicle 702 or located remotely from flight vehicle 702. Portable computer 750 may be a ruggedized laptop computer suitable for use in a harsh environment and configured to communicate with flight vehicle controller 704 to upload and/or download information including mission program 724 and/or status information across communication link 752. Both communication links (744, 752) may access flight vehicle controller through intra-vehicular communication unit 712, where links (744, 752) may include wired, wireless, and/or optical communication paths.

External communication unit 714 may send status information to and receive command information from a remote vehicle commander 760 across communication link 762 that may include any wireless communication technology, including Radio Frequency (RF), microwave, and optical communications. The vehicle status information can include the operational status (e.g., health) and/or history of various flight vehicle systems. External communication unit 714 may include one or more antennas, receivers, and/or optical detectors that may be use instead of or in addition to any external communication equipment already available on flight vehicle 702. Either intra vehicle communications unit 712 or external communications unit 714 are configured to send command messages to and receive status messages from flight vehicle controller 704.

Sensor unit 716 may include one or more sensors, such as a Global Positioning Satellite (GPS) receiver configured to provide location information, dynamic sensors for detecting acceleration and/or rotation, altimeter for detecting altitude, cabin sensors for air-pressure, oxygen level, and/or temperature, environmental sensors for detecting conditions either inside or outside the aircraft, and/or reconnaissance. In one embodiment, sensor unit 716 may include a GPS receiver such as manufactured by NovAtel of Calgary, Alberta, Canada. Other sensors may be included and listed sensors may be omitted in some embodiments, so this list should not be considered as limiting.

Figure 8:
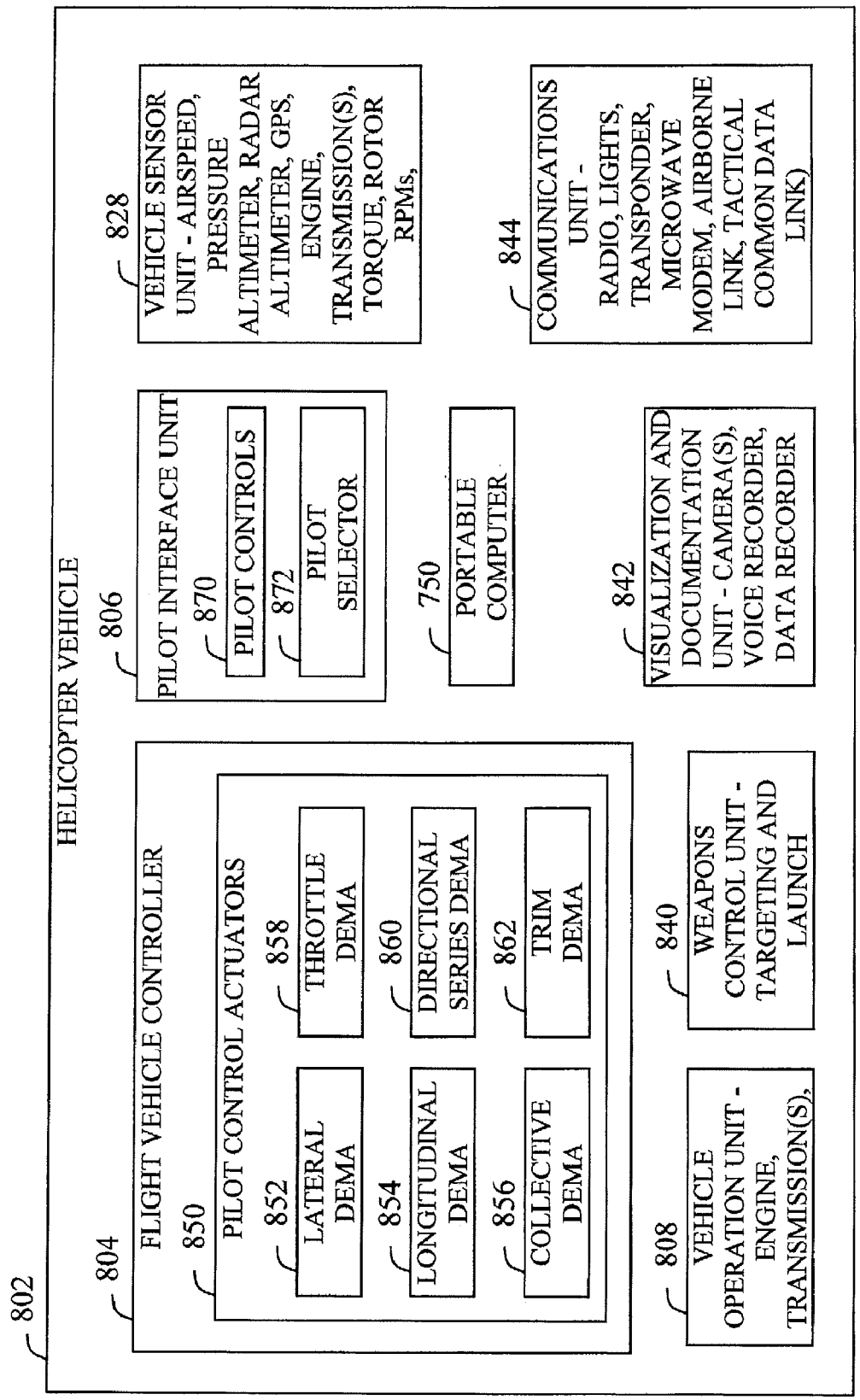
FIG. 8 is a functional block diagram of a helicopter vehicle according to an embodiment of the present invention.

FIG. 8 is a functional block diagram of an exemplary embodiment of a helicopter vehicle 802 in accordance with the present invention. Helicopter vehicle 802 is a particular embodiment of vehicle 702 in FIG. 7, and may include a flight vehicle controller 804, a pilot interface unit 806, a vehicle operation unit 808, a vehicle sensor unit 828, a weapons control unit 840, a visualization and documentation unit 842, a communications unit 844, and/or a portable computer 750.

Flight vehicle controller 804 is a particular embodiment of vehicle controller 120 of FIG. 1, and may include pilot control actuators 850 that are a particular embodiment of pilot control actuators 708 shown in FIG. 6. Pilot control actuators 850 may include a lateral DEMA 852, a longitudinal DEMA 854, a collective DEMA 856, a throttle DEMA 858, a directional series DEMA 860, and/or a trim DEMA 862. Lateral DEMA 852, comprising a roll actuator pair, may be configured to provide roll control of helicopter vehicle 802 through roll controlling elements of pilot controls 870. Similarly, longitudinal DEMA 854, Collective DEMA 856, throttle DEMA 858, directional series DEMA, and trim DEMA provide control of associated helicopter pilot controls 870.

Pilot interface unit 806 is a particular embodiment of pilot interface unit 106 shown in FIG. 1, and may include pilot controls 870 and/or pilot selector 872. Pilot selector 872 is a particular embodiment of pilot selector 130 shown in FIG. 1. Vehicle operation unit 808 is a particular embodiment of vehicle operation unit 108 in FIG. 1 and may include an airspeed sensor, a pressure altimeter, a radar altimeter, a Global Positioning System (GPS), as well as sensors to measure engine speed, torque, transmission operation, and rotor speed. Although specific sensors are described, this should not be considered as limiting.

Weapons control unit 840 may provide targeting and launch control over one or more weapon systems associated with helicopter vehicle 802 including air-to-air missiles, Gatling cannon, chaff dispensers, and/or tactical countermeasures. Visualization and documentation unit 842 may include one or more cameras, a voice recorder, and/or a data recorder to provide visualization and documentation of a helicopter mission including weapons targeting and deployment information, vehicle navigation, and/or vehicle and/or vehicle controller sensor readings. Communications unit 844 may include radios, lights, a vehicle transponder, a microwave modem, and/or an airborne link, such as the tactical common data link (TCDL). Portable computer 750 may provide mission data for use by a pilot and/or flight crew where the mission data may include a mission program for use in flight vehicle controller 804. Alternatively, portable computer 750 may provide survey and/or environmental information for a pilot and/or passengers.

Modification of an existing helicopter platform provides an unmanned helicopter with the same performance as its manned counterpart, where pilot control actuators are tied into the pilot controls of the existing helicopter controls in a parallel fashion so that the pilot control actuators may be quickly engaged or disengaged. A flight control computer in flight vehicle controller 804 may provide commands to the actuators using aircraft state data to determine the appropriate commands to fly the defined mission profiles. The quick disconnect feature of the actuators provide an effective safety feature to the manned aircraft and does not increase the control loads in the baseline aircraft control system. One exemplary embodiment of the quick disconnect capability may include a belt-drive in combination with an electric or electromechanical clutch.

Figure 9:
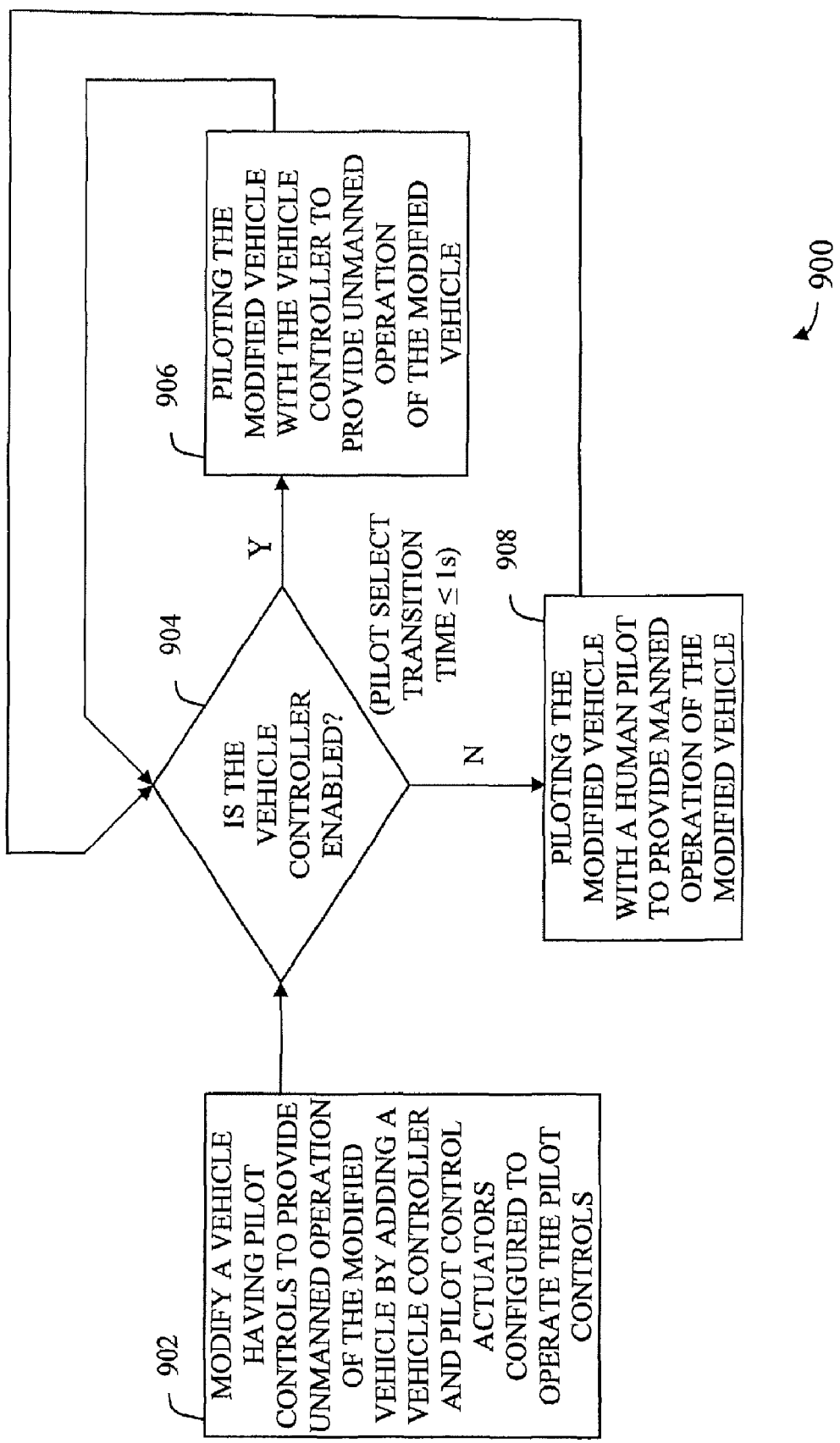
FIG. 9 is a flow diagram of a multi-mode unmanned and manned vehicle piloting method according to an embodiment of the present invention.

FIG. 9 is a flow diagram of an example embodiment of a multi-mode unmanned and manned vehicle piloting method 900 in accordance with the present invention. Method 900 includes a method of piloting a vehicle including the operations of modifying a vehicle having at least one pilot control to include a vehicle controller and at least one pilot control actuator in operation 902, where the at least one pilot control actuator is operatively coupled with the at least one pilot control. A plurality of pilot controls and pilot control actuators may be used.

Method 900 continues with detecting whether the vehicle controller is enabled in operation 904. Detection in this case may be accomplished by vehicle controller 120, where the status of pilot selector 130 is examined as discussed above in reference to FIG. 1. If vehicle controller 120 is enabled, then flow 900 continues with piloting the modified vehicle with the vehicle controller to provide unmanned operation of the modified vehicle in operation 906. Conversely, if the vehicle controller is not enabled, then flow 900 continues with piloting the modified vehicle with a human pilot to provide manned operation of the modified vehicle in operation 908.

During manned and/or unmanned operation of the modified vehicle, the status of pilot selector 130 may again be assessed, where method 900 returns to operation 904 after a predetermined delay, such as a control system sampling period. In this manner, operation of pilot selector 130 to enable and/or disable vehicle controller 120 may be detected and a smooth transition effected between manned and unmanned operation as well as between unmanned and manned operation. The pilot select transition time between the time at which the vehicle controller is enabled to provide unmanned operation of the modified vehicle and time at which the vehicle controller is disabled to provide manned operation of the modified vehicle is less than about one second after a selection change is registered. This rapid pilot select transition time may also be considered a "quick disconnect" feature that enables a human pilot to rapidly take command of a modified vehicle previously under the command of the vehicle controller.

Figure 10:
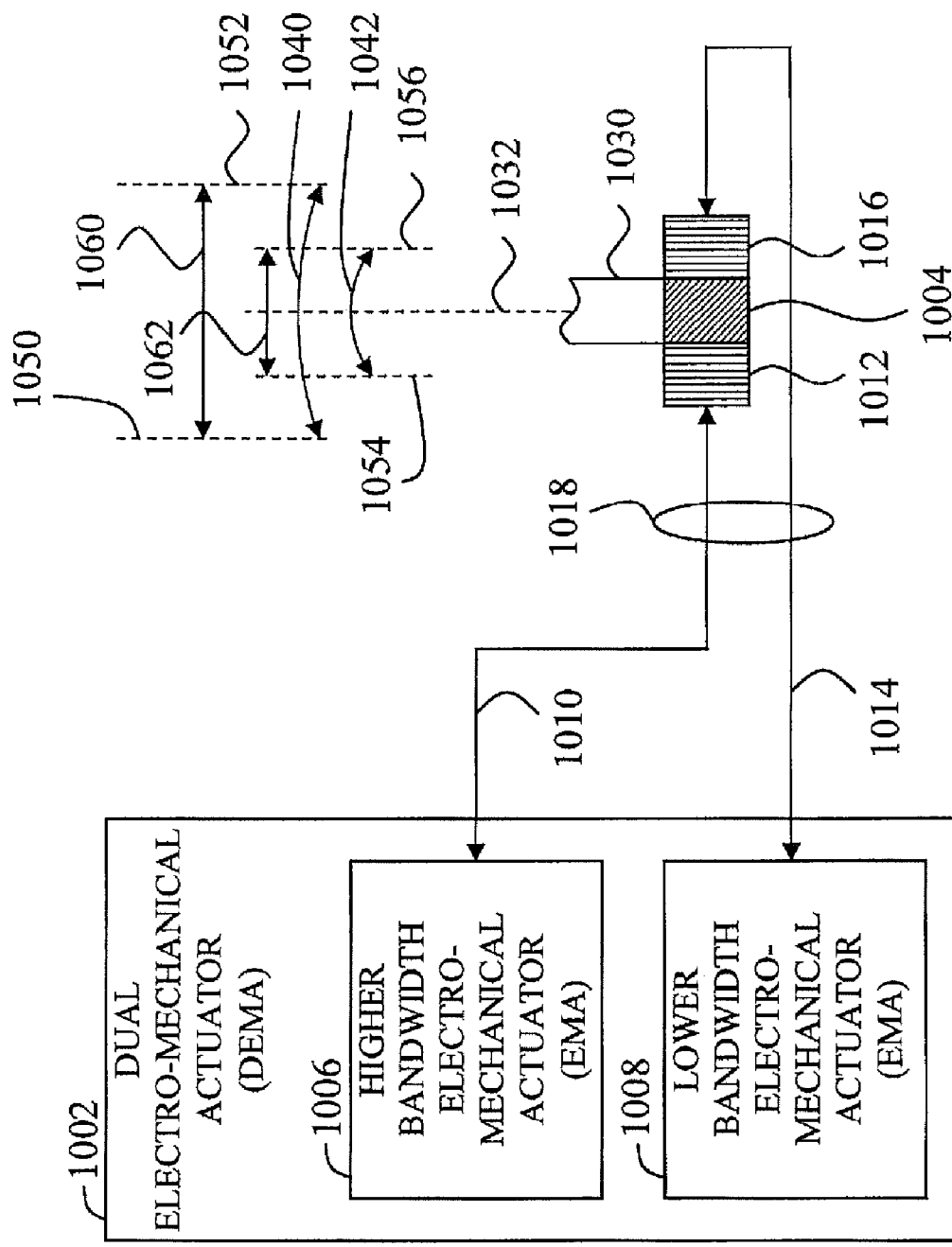
FIG. 10 is a schematic and functional block diagram of an exemplary dual electromechanical actuator (DEMA) operatively coupled to an interface element according to an embodiment of the present invention.

FIG. 10 shows an exemplary dual electromechanical actuator (DEMA) 1002 operatively coupled to an interface element (IE) 1004 according to an embodiment of the present invention. DEMA 1002 is a particular embodiment of DEMA 220 in FIG. 2, and may include a higher-bandwidth (HB) electromechanical actuator (HB-EMA) 1006 and a lower-bandwidth LB-EMA 1008. A higher-bandwidth EMA may have a faster response time to electronic control and/or a quicker movement through a particular range of motion and/or rotation. Conversely, a lower-bandwidth EMA may have a slower response time and/or a slower movement through a particular range of motion and/or rotation. In some exemplary embodiments, a gear ratio of a transmission device may determine the torque and/or response speed as a measure of bandwidth. HB-EMA 1006 and LB-EMA 1008 may be operatively coupled to interface element (IE) 1004 in a parallel connection so that both HB-EMA 1006 and LB-EMA 1008 may independently control the same type of motion of IE 1004. Other DEMAs may be used, so this description should not be considered as limiting.

HB-EMA 1006 may be coupled through a first linkage 1010 operatively coupled to a first clutch 1012 that selectively couples movement on a first linkage 1010 to a first portion of IE 1004. First clutch 1012 may be engaged to couple movement between first linkage 1010 and the first portion of IE 1004 and disengaged to isolate movement of first linkage 1010 and IE 1004. Similarly, LB-EMA 1008 may be coupled through a second linkage 1014 operatively coupled to a second clutch 1016 that selectively couples movement on a second linkage 1014 to a second portion of IE 1004. Second clutch 1016 may be engaged to couple movement between second linkage 1014 and the second portion of IE 1004 and disengaged to isolate movement of second linkage 1014 and IE 1004. First clutch 1012 and second clutch 1016 may be electrically operated to selectively and independently couple movement on the first and second linkages (1010, 1012) to IE 1004. Together, linkage 1010 and linkage 1014 may comprise a parallel linkage 1018 that is a particular embodiment of linkage 222 shown in FIG. 3. Further, LB-EMA 1008 may provide movement through an entire range of motion, while HB-EMA 1006 may provide movement through only a portion of the entire range of motion. In this manner, LB-EMA 1008 may have full authority and HB-EMA may have only partial authority. Due to the faster response time of HB-EMA 1006, the authority of movement is restricted to limit potential control instability. Further, the dual actuator configuration provides for redundancy in the case of a component or system failure.

The larger scope of LB-EMA 1008 defines a full authority of pilot control movement covering the entire range of allowable motion for the particular pilot control. The smaller scope of HB-EMA 1006 defines a partial authority for pilot control movement having a first center of travel when HB-EMA 1006 is engaged with the pilot control. LB-EMA 1008 may be included as a part of an existing aircraft trim system or supplied separately for a pilot control without an associated trim element. In this and other embodiments, an existing vehicle having entirely manual pilot controls may be modified for unmanned operation while maintaining the ability to pilot the vehicle in a manned vehicle mode.

In this exemplary embodiment, DEMA 1002 is a particular embodiment of lateral DEMA 220, while IE 1004 is a particular embodiment of cyclic extension 302, both shown in FIG. 3. In this embodiment, IE 1004 is connected to a pilot control 1030 that is a particular embodiment of cyclic 204 shown in FIG. 3. For descriptive purposes, pilot control 1030 has an axis 1032 extending through a portion of pilot control 1030 that defines motion through a range of lateral and/or rotational movement. In one example, movement of pilot control through a plane of motion defined as a back-and-forth movement through a larger range 1040 that includes a smaller range 1042, where larger range 1040 defines movement from a first limit 1050 to a second limit 1052, while smaller range 1042 defines movement from a third limit 1054 and a fourth limit 1056. In this manner, movement through the larger range 1040 has a first range of motion 1060 and movement through the smaller range 1042 has a second range of motion 1062. Although smaller range 1042 is shown as entirely included within larger range 1040, this should not be considered as limiting, since larger range 1040 and smaller range 1042 may completely overlap, partially overlap, or be non-overlapping. Further, smaller range 1042 may not be centered within larger range 1040, and may instead be defined anywhere in the range of motion defined for IE 1004.

First clutch 1012 may be engaged with IE 1004 while second clutch 1014 is disengaged from IE 1004, or vice versa. In this manner, when second clutch 1016 is engaged, LB-EMA 1008 may hold the position of pilot control 1030, while first clutch 1012 is disengaged, allowing HB-EMA 1006 to be positioned into a favorable new position prior to re-engagement of first clutch 1012. Similarly, when first clutch 1012 is engaged, HB-EMA 1006 may hold the position of pilot control 1030, while second clutch 1016 is disengaged, allowing LB-EMA 1008 to be positioned into a favorable new position prior to re-engagement of second clutch 1016. In this manner, the EMAs (1006, 1008) may be repositioned relative to each other in order to avoid exceeding an actuator travel limit while operating an associated pilot control. The actuator travel limit may include an end-point of movement or a region of movement having a property such as higher/lower torque, and/or response time/speed.

Figure 11:
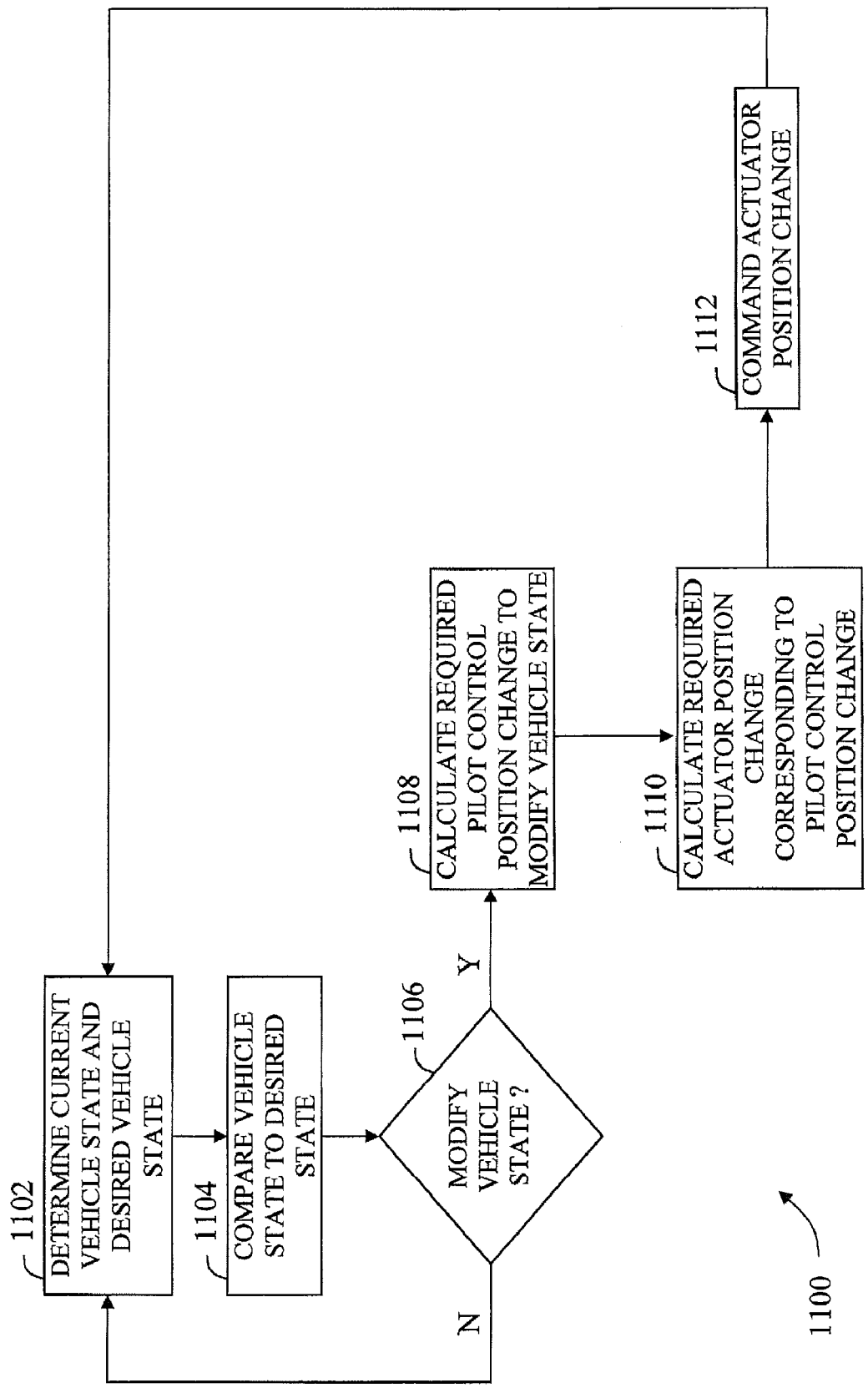
FIG. 11 is an operation flow diagram of an unmanned operation corresponding to piloting the modified vehicle using the vehicle controller according to an embodiment of the present invention.

FIG. 11 is an unmanned operation flow diagram 1100 corresponding to piloting the modified vehicle using the vehicle controller according to an embodiment of the present invention. Flow 1100 may include the operations of determining the current vehicle state and desired vehicle state in operation 1102, comparing the current vehicle state to the desired vehicle state to determine a vehicle state difference in operation 1104, and determining whether to modify the vehicle state in operation 1106. If the differences between the current vehicle state to the desired vehicle state are small (e.g., below a predetermined threshold), then the determination in operation 1106 will be "N" and control will move to operation 1102.

Alternatively, if the differences between the current vehicle state and the desired vehicle state are above a predetermined threshold, then the determination in operation 1106 will be "Y" and control will move to operation 1108. Flow 1100 continues with calculating the change in one or more pilot control positions corresponding to the vehicle state difference in operation 1108, where the change in the pilot control position is required to produce the desired vehicle state change. Once the change in each pilot control position is calculated, flow 1100 continues with calculating the required actuator position change corresponding to the pilot control position change in operation 1110. Once the new actuator position is determined, flow 1100 continues with commanding the new actuator position in operation 1112, and control moves to operation 1102.

FIG. 12 shows an actuator positioning flow diagram 1200, according to an embodiment of the present invention. Positioning flow 1200 corresponds to a particular embodiment of operation 1110 described in reference to FIG. 11. Flow 1200 begins in operation 1202 where positioning flow 1200 is invoked to command one or more new pilot control positions, and control moves to operation 1204 which determines whether or not each pilot control commanded to change corresponds to a high control load that requires adjustment. If a particular commanded pilot control is a high control load that requires adjustment, the determination in operation 1204 is "Y" and control moves to operation 1206, where the control load is adjusted using a low bandwidth actuator coupled to the vehicle pilot control. In one embodiment, the low bandwidth actuator may be included as a part of an existing vehicle trim system. If no adjustment is required in operation 1204, the determination is "N" and control moves to operation 1208, where a determination is made regarding whether the commanded position for a particular actuator will exceed the actuator travel limits. If the actuator travel limits will not be exceeded by moving to the newly commanded pilot control position, the determination in operation 1208 is "N" and control moves to operation 1210, where the actuator position is changed as commanded. Once each of the selected pilot control actuators is changed to the commanded position, flow 1200 concludes in operation 1212 with a stop.

In operation 1208, if the actuator travel limits will be exceeded by moving to the newly commanded pilot control position, the determination in operation 1208 is "Y," and control moves to operation 1214. Further, if the expected operational motion at the new actuator position may exceed the actuator travel limits, then adjustment may also be required in order to avoid limiting or rough operation of the associated pilot control. Flow 1200 continues by disengaging the limit exceeding actuator from the associated operator control in operation 1214, moving the actuator position to a center of travel for the particular actuator in operation 1216, and re-engaging the particular actuator to the pilot control in operation 1218, and control moves to operation 1210. In this manner, an actuator configured to operate a particular pilot control is realigned to the center of travel to provide flexibility of actuator movement without exceeding actuator movement limits. In one embodiment, an electromechanical clutch device may be used to selectively engage and disengage a mechanical coupling between a portion of the particular actuator and the particular pilot control.

FIG. 13 shows an exemplary dual electromechanical actuator (DEMA) 1302 operatively coupled to an interface element (IE) 1304, according to an embodiment of the present invention. DEMA 1302 is a particular embodiment of DEMA 208 in FIG. 2, and may include a higher-bandwidth (HB) electromechanical actuator (HB-EMA) 1306 and a lower-bandwidth LB-EMA 1308. HB-EMA 1306 and LB-EMA 1308 may be operatively coupled to interface element (IE) 1304 in a series connection so that both HB-EMA 1306 and LB-EMA 1308 may cooperatively control the same type of motion of IE 1304. Other DEMAs may be used, so this description should not be considered as limiting. HB-EMA 1306 may be coupled through a first linkage 1310 operatively coupled to a first clutch 1312 that selectively couples movement on a first linkage 1310 to a first portion of IE 1304. Similarly, LB-EMA 1308 may be coupled through a second linkage 1314 operatively coupled to a second clutch 1316 that selectively couples movement on a second linkage 1314 to a second portion of IE 1304. First linkage 1310 and second linkage 1314 may each be a drive belt for coupling the rotational movement of a portion of first clutch 1312, and second clutch 1316 may be electrically operated to selectively and cooperatively couple movement on the first and second linkages (1310, 1312) to IE 1304. Together, linkage 1310 and linkage 1314 may comprise a linkage 1318 that is a particular embodiment of linkage 234 shown in FIG. 2.

FIG. 14 is a schematic an end view of first clutch 1312, second clutch 1316, and interface element 1314, according to an embodiment of the present invention. First clutch 1312 is configured to impart back and forth rotational movement about a long axis of IE 1304 in a smaller range of motion 1402 between a first limit 1404 and a second limit 1406. Similarly, second clutch 1316 is configured to impart back and forth rotational movement about the long axis of IE 1304 in a larger range of motion 1420 between a first limit 1422 and a second limit 1424. Since smaller range of motion 1402 is smaller than larger range of motion 1420, first clutch 1312 may be disengaged from IE 1304, move to a new position at or near an expected center of travel 1430, and then re-engaged with IE 1304, as described in reference to FIG. 12. In this manner, while second clutch 1316 maintains the position of IE 1304, the range of motion 1402 may be centered about center of travel 1430, allowing first EMA 1306 to provide a full-range of expected motion at a higher bandwidth. Similarly, first clutch 1312 may be engaged while second clutch 1316 is disengaged in order to provide positive control of IE 1304 at all times. In this manner, either clutch may be alternately engaged or disengaged to re-adjust a center point of operation. Although smaller range 1402 is shown as entirely included within larger range 1420, this should not be considered as limiting since larger range 1420 and smaller range 1402 may completely overlap, partially overlap, or be non-overlapping. Further, smaller range 1402 may not be centered within larger range 1420, and may instead be defined anywhere in the range of motion defined for IE 1304.

In one application, second EMA 1308 is not moving and second clutch 1316 is engaged to maintain IE 1304 in a stationary position while first clutch 1312 is re-adjusted. Alternatively, first EMA 1306 is not moving and first clutch is engaged to maintain IE 1304 in a stationary position while second clutch 1316 is re-adjusted. In this manner, either EMA/clutch pair may independently control the operation of IE 1304 to provide for re-adjustment of the other EMA/clutch pair and to compensate for system failures where either EMA/clutch pair or the related control hardware and/or software may not be functioning properly. In another application, second EMA 1308 is moving according to the commands of a vehicle control loop. In this case, first EMA 1306 is moved in harmony with the movement of second EMA 1308 to provide a smooth clutching and de-clutching action whether IE 1304 is stationary or moving at the time of readjustment. Although rotational motion is described in reference to rotational motion limits, EMAs (1306, 1308) may be used to provide linear movement in reference to linear motion limits. Hence, the type of EMA and/or movements described above should not be considered as limiting.

One or more embodiments of the present invention provide various benefits, including lower unmanned vehicle development and deployment costs, while providing enhanced multimode unmanned and manned vehicle capabilities. Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for converting a manned aircraft for unmanned flight operations, the aircraft being of a type including a pilot control capable of being manipulated by a human pilot to affect operation of the aircraft, the method comprising:

mounting a first actuator aboard the aircraft, the first actuator being configured to selectively provide at least one of movement and resistance to movement of the pilot control in a first manner including at least one of linear and rotational motion and having a first scope describing a first amount of allowable movement;

coupling the first actuator to the pilot control with a first clutch configured to selectively couple and decouple movement of the first actuator to and from the pilot control;

mounting a second actuator aboard the aircraft, the second actuator being configured to selectively provide at least one of movement and resistance to movement of the pilot control in the first manner and having a second scope larger than the first scope;

coupling the second actuator to the pilot control with a second clutch, the second clutch being configured to selectively couple and decouple movement of the second actuator to and from the pilot control independently of the first actuator; and, mounting a vehicle controller aboard the aircraft, the vehicle controller being configured to operate the first actuator, the first clutch, the second actuator, and the second clutch to selectively manipulate the pilot control, wherein the vehicle controller is capable of being selectively enabled so as to operate the pilot control actuators and clutches and thereby provide unmanned operation of the aircraft, and of being disabled during flight so as to provide for manned operation of the aircraft by the human pilot.

2. The method of claim 1, further comprising:

mounting a flight control computer aboard the aircraft, the flight computer being configured to execute a mission program for operating the pilot control actuators and clutches via the vehicle controller to pilot the aircraft according to the mission program; and, operably coupling the flight control computer to the vehicle controller.

3. The method of claim 1, further comprising:

mounting an external communications unit aboard the aircraft, the external communications unit being configured to communicate aircraft command and status signals between the vehicle controller and a remote location; and, operably coupling the external communications unit to the vehicle controller.

4. The method of claim 1, wherein the aircraft is one selected from the group consisting of a helicopter and an airplane.

\* \* \* \* \*